US009030499B2

(12) United States Patent
Börger et al.

(10) Patent No.: US 9,030,499 B2
(45) Date of Patent: May 12, 2015

(54) CUSTOM LABELING OF A MAP BASED ON CONTENT

(75) Inventors: Marcus Börger, Rueschlikon (CH);
Christos Savvopoulos, Zurich (CH);
Jonah Jones, San Francisco, CA (US)

(73) Assignee: Google Inc., Mountain View, CA (US)

( * ) Notice: Subject to any disclaimer, the term of this patent is extended or adjusted under 35 U.S.C. 154(b) by 228 days.

(21) Appl. No.: 13/590,082

(22) Filed: Aug. 20, 2012

(65) Prior Publication Data
US 2014/0049564 A1 Feb. 20, 2014

(51) Int. Cl.
*G09G 5/00* (2006.01)
*G06T 1/00* (2006.01)
(52) U.S. Cl.
CPC ........................................ *G06T 1/00* (2013.01)
(58) Field of Classification Search
CPC ..................... H04M 1/72572; H04M 1/27455; G01C 21/20; G01C 21/367; G06T 1/00
USPC .......................................................... 345/660
See application file for complete search history.

(56) References Cited

U.S. PATENT DOCUMENTS

| 8,164,599 | B1 | 4/2012 | Kadous et al. |
| 8,239,130 | B1 | 8/2012 | Upstill et al. |
| 2008/0010273 | A1 | 1/2008 | Frank |
| 2010/0023259 | A1 | 1/2010 | Krumm et al. |
| 2010/0211909 | A1 | 8/2010 | Ghanekar et al. |
| 2012/0172062 | A1 | 7/2012 | Altman et al. |

*Primary Examiner* — Devona Faulk
*Assistant Examiner* — Peter Hoang
(74) *Attorney, Agent, or Firm* — Dority & Manning, P.A.

(57) ABSTRACT

A system and method for generating a content based, custom labeled map is provided. A request for a map is received. The request includes a geographical area to be displayed in the map and a type of content item to be displayed in the map. A plurality of orientation points to display on the map is determined based on a ranking of locations in the geographical area, and one or more pieces of content to be associated with each orientation point is determined. Each orientation point is ranked based in part on ranks of the one or more pieces of content associated with each orientation point. A map is generated to display at the locations of the plurality of orientation points the pieces of content associated with each orientation point at a level of prominence that is based on the ranking of each orientation point.

20 Claims, 6 Drawing Sheets

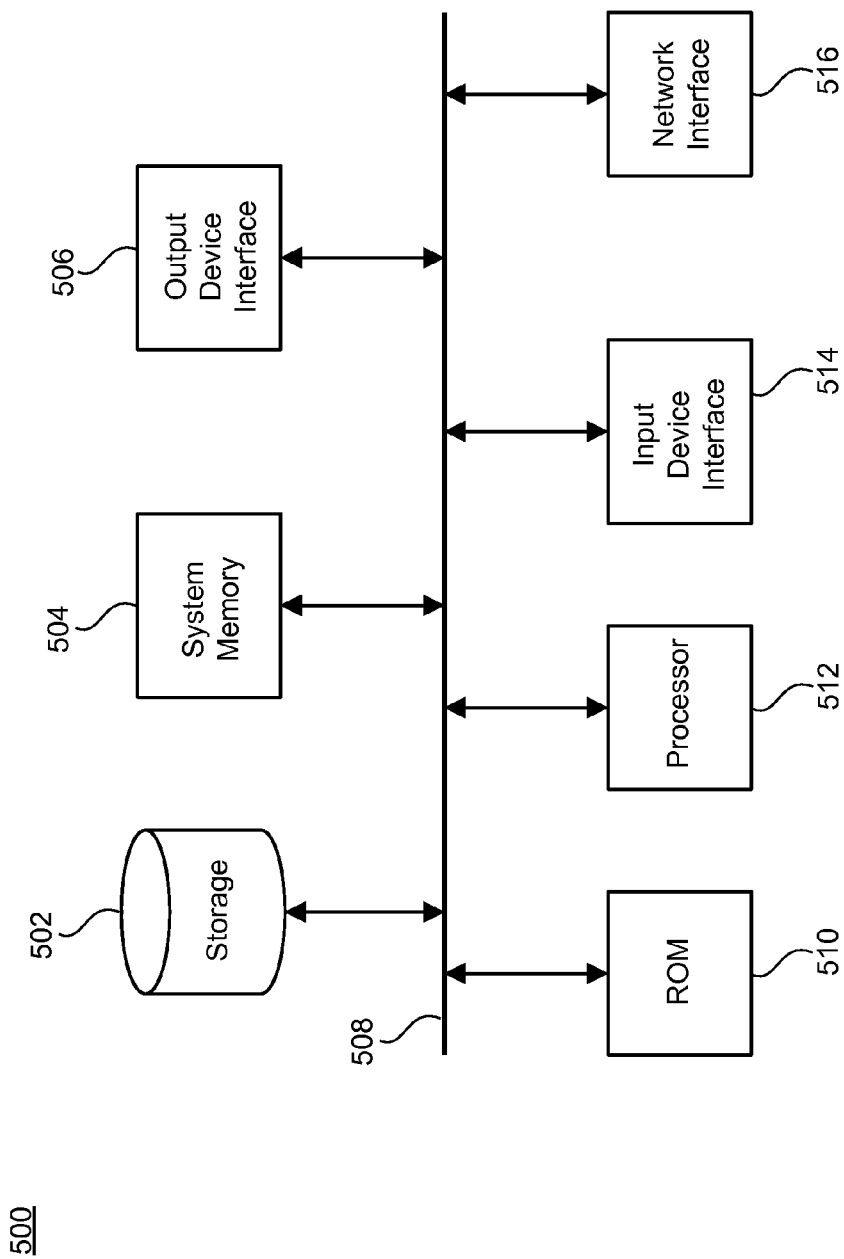

CUSTOM LABELING OF A MAP BASED ON CONTENT

BACKGROUND

1. Field

The present disclosure generally relates to software based maps, and more particularly to labeling a software based map with customized content.

2. Description of the Related Art

Current software based maps may include basic text and icons that appear on the map at default locations. Adding additional icons and text to the map to display certain types of content (e.g., weather or photos) may interfere with the basic text and icon information or result in an overcrowded map display.

SUMMARY

The disclosed subject technology relates to a method for generating a content based, custom labeled map. The method includes receiving a request for a map, including a geographic area to be displayed in the map and a type of content item to be displayed in the map; determining, based on a ranking of locations in the geographical area, a plurality of orientation points to display on the map. The method also includes determining, for each of the plurality of orientation points, one or more pieces of content to be associated with each orientation point. Each of the one or more pieces of content has a ranking. The method further includes ranking each of the plurality of orientation points based at least in part on the ranks of the one or more pieces of content associated with each orientation point, and generating a map to display at the locations of the plurality of orientation points the one or more pieces of content respectively associated with each orientation point at a level of prominence that is based on the ranking of each orientation point.

The disclosed subject technology further relates to a system for generating a content based, custom labeled map. The system includes one or more processor and one or more memories containing processor-executable instructions. When executed by the one or more processor, the processor-executable instructions causes the system to receive a request for a map, including a geographic area to be displayed in the map and a type of content item to be displayed in the map, and determine, based on a ranking of locations in the geographical area, a plurality of orientation points to display on the map. The processor-executable instructions also causes the system to determine, based on a ranking of locations in the geographical area, a plurality of orientation points to display on the map, and determine, for each of the plurality of orientation points, one or more pieces of content to be associated with each orientation point, where each of the one or more pieces of content has a ranking. The processor-executable instructions further causes the system to rank each of the plurality of orientation points based at least in part on the ranks of the one or more pieces of content associated with each orientation point, and generate a map to display at the locations of the plurality of orientation points the one or more pieces of content respectively associated with each orientation point at a level of prominence that is based on the ranking of each orientation point and to display a label indicating the locations of the plurality of orientation points.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for the purpose of explanation, several aspects of the subject technology are set forth in the following figures.

FIG. 5 is a block diagram illustrating an electronic system with which some implementations of the subject technology are implemented.

DETAILED DESCRIPTION

In the following detailed description, numerous specific details are set forth to provide a full understanding of the subject technology. It will be apparent, however, that different aspects of the subject technology may be practiced without some of these specific details. In other instances, well-known structures and techniques have not been shown in detail so as not to obscure the disclosure.

The disclosed subject technology describes systems and techniques for labeling a map with content. The disclosed subject technology first identifies orientation points that correspond to prominent locations on the map. The orientation points may be ranked based on different criteria (e.g., population or popularity), and different orientation points may appear at different zoom levels of the map based on their ranking.

Pieces of content are also obtained that allow for customization of the map. Content can include weather information, photographs, video, or specific event based information (e.g., election results) that is to be displayed on the map. The pieces of content may be associated with a location (e.g., weather information may originate from a weather station having a physical location). The pieces of content may be associated with respective ones of the orientation points in order to generate a map of content information displayed at the location of the orientation points.

Content information may be associated with the orientation points based on one or more criteria, including proximity of location (e.g., each piece of content may be associated with the closest orientation point). Multiple pieces of content may be associated with a single orientation point (e.g., multiple photo's may be associated with NYC) or a single piece of content may be associated with multiple orientation points (e.g., information from a weather station at JFK International airport may be associated with several nearby cities). Pieces of content may also be associated with orientation points based on the weight or ranking of the pieces of content. The ranking may be based, e.g., on the accuracy of the content, popularity of the content, or other criteria.

The orientation points may then be re-ranked based on the rankings or weights of the pieces of content that are associated with them. Finally, the pieces of content can be displayed at the orientation points based on the ranking or re-ranking of the orientation points. A displayed piece of content may include a label indicating the location of the orientation point with which the piece of content is associated.

Figure 1:
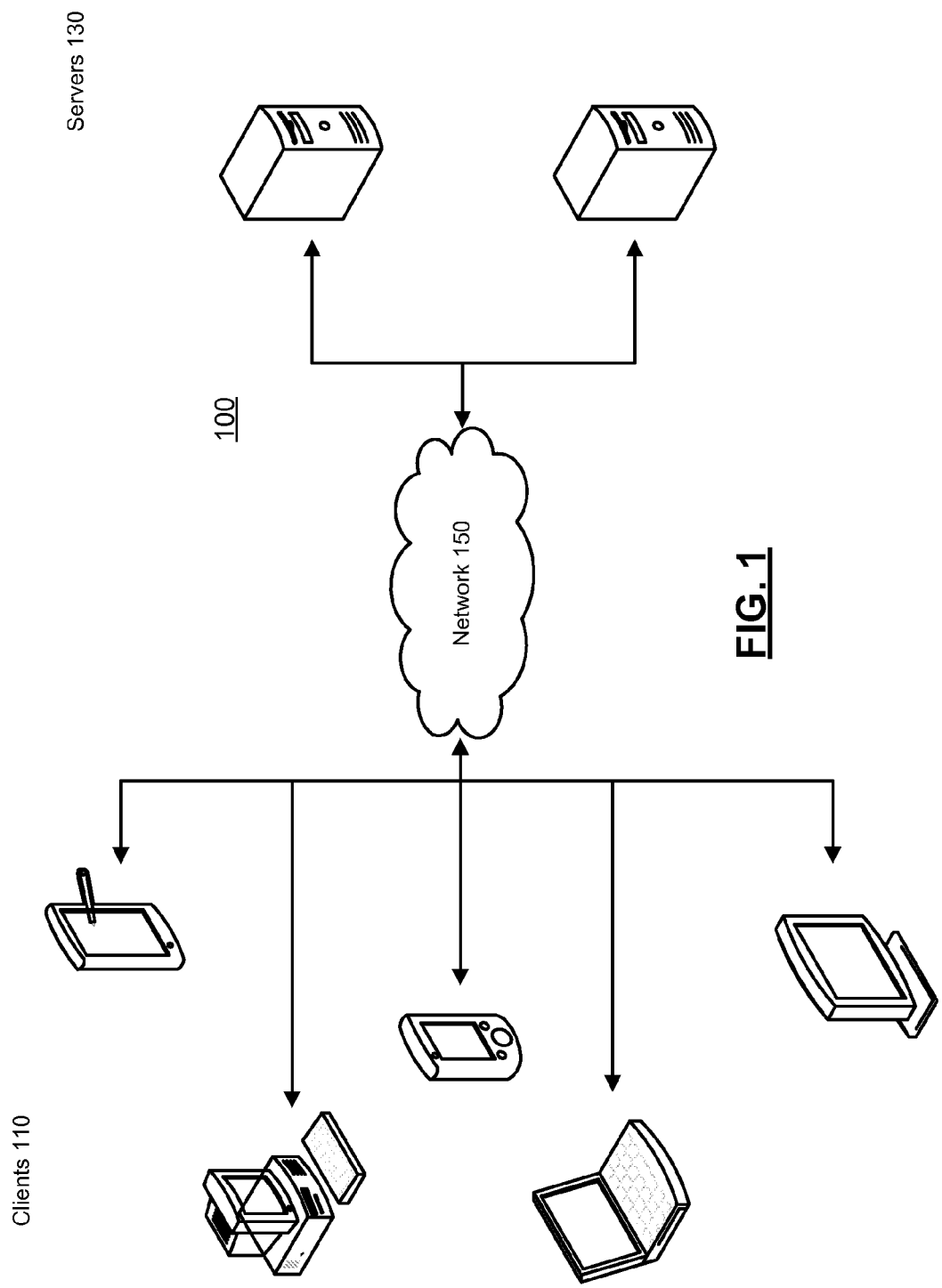
FIG. 1 illustrates an example system for custom labeling a map based on content.

Turning now to the drawings, FIG. 1 illustrates an example system 100 for generating a custom labeled, content based map. The system 100 includes clients 110 and servers 130 connected over a network 150.

The system 100 is comprised of client(s) 110, server(s) 130 and the network 150 in any combination or configuration that allows for content based custom labeling of a map, including implementations with multiple servers 130. Each of the clients 110 can be, for example, desktop computers, laptop computers, mobile devices (e.g., a smartphone, tablet computer, or PDA), set top boxes (e.g., for a television), video game consoles, or any other devices having an appropriate processor, memory, and communications capabilities. In certain instances, different versions and/or configurations of the system that include subject technology as disclosed herein are available for download from a server 130 and subsequent installation on client 110. The servers 130 can be any device having a processor, memory, and communications capability for hosting the data for installing and hosting the system. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a ring network, a mesh network, a star-bus network, tree or hierarchical network, and the like.

Figure 2:
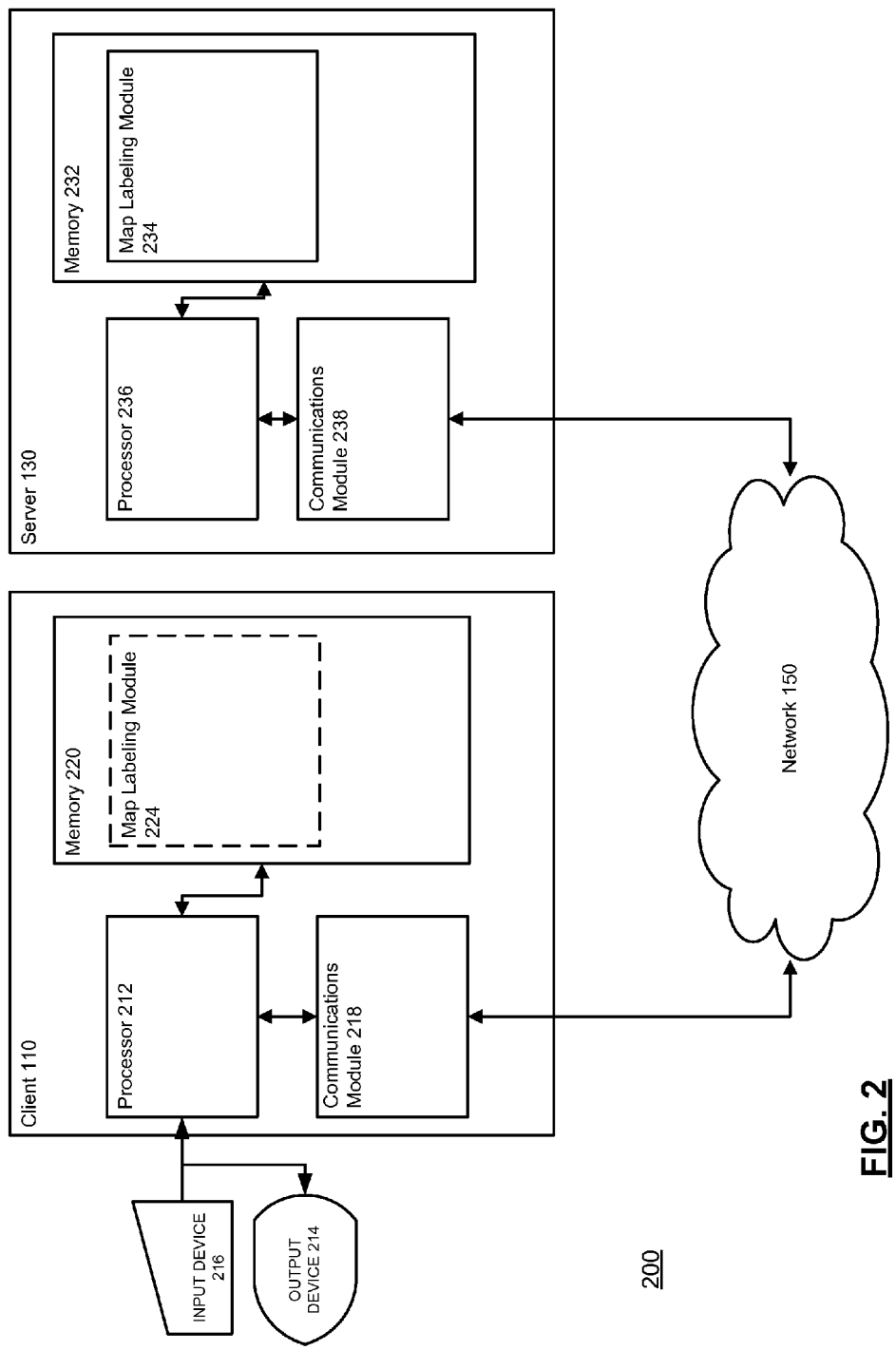
FIG. 2 is a block diagram illustrating an example client and server from the system of FIG. 1 according to certain aspects of the disclosure.

FIG. 2 is a block diagram illustrating an example client and server from the system 100 of FIG. 1 according to certain aspects of the subject technology. The client 110 and the server 130 are connected over the network 150 via respective communications modules 218 and 238 and are configured to interface with the network 150 to send and receive information, such as data, requests, responses, and commands to other devices on the network. The communications modules 218 and 238 can be, for example, modems or Ethernet cards.

The client 110 includes a processor 212, a communications module 218, and a memory 220 that may include a map labeling module 224.

The processor 212 of the client 110 is configured to execute instructions, such as instructions physically coded into the processor 212, instructions received from software in memory 220, or a combination of both. For example, the input device 216 may provide textual information to processor 212 which is processed by a map labeling module 224 stored in memory 220. The textual information may then be sent through network 150 via communications module 218 to server 130, which receives the information through communications module 238. Map labeling module 224 may include a web browser and software providing custom map applications for use with client 110. Some features of the map labeling module 224 may be accessible by the client 110 without communicating with server 130. For instance, custom maps that have been previously displayed on client 110 may be saved to the client 110 for future display on output device 214.

Server 130 includes a processor 236, a communications module 238, and a memory 232 that may include a map labeling module 234.

Processor 236 is configured to execute instructions, such as instructions physically coded into the processor 236, instructions received from software in memory 232, or a combination of both.

Processor 236 processes information from map labeling module 234 and sends information through communications module 238, through network 150, to client 110 to be displayed on output device 214.

Figure 3:
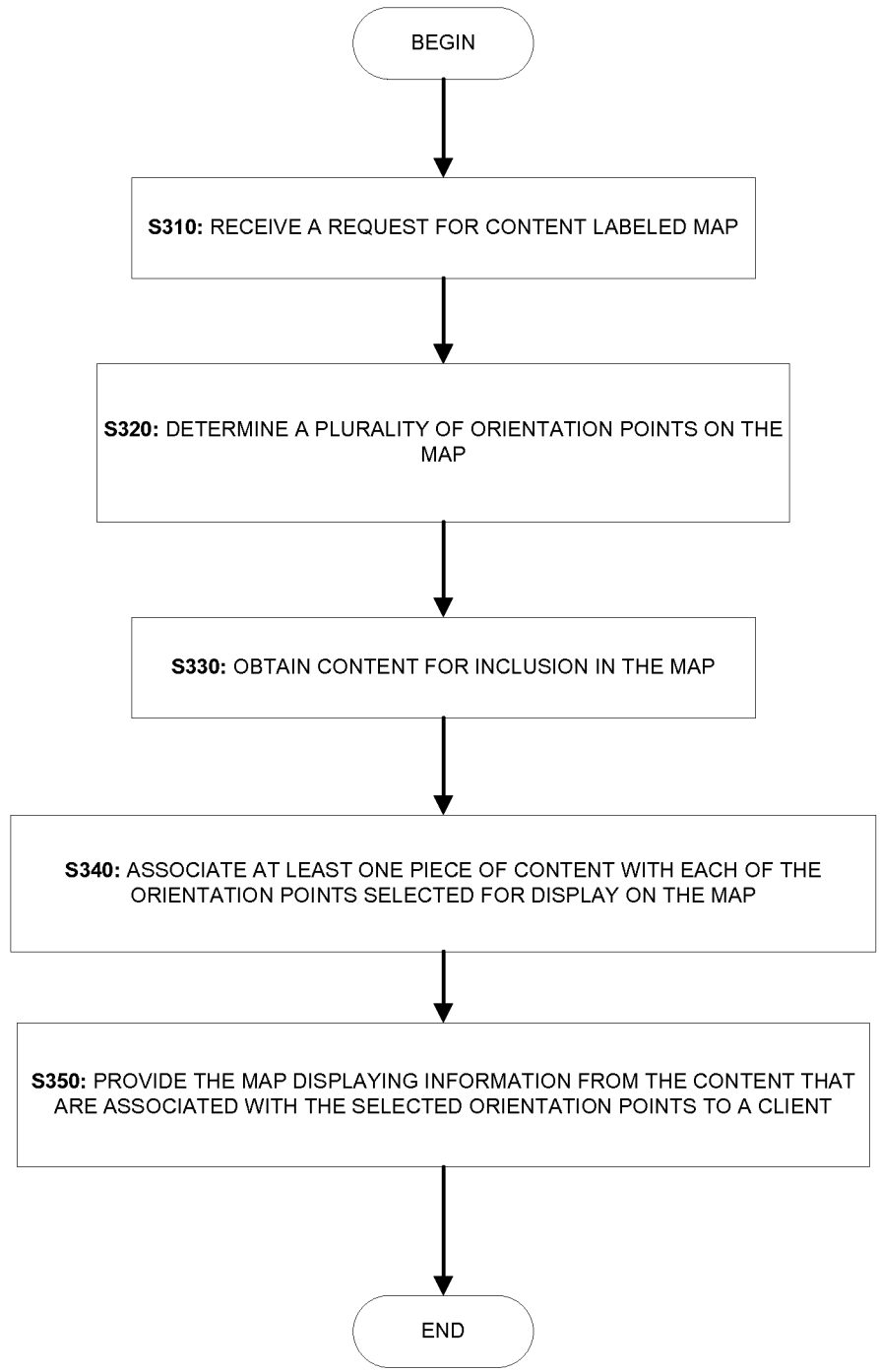
FIG. 3 illustrates an example process for custom labeling a map based on content.

FIG. 3 illustrates an example process 300 for generating a content based, custom labeled map. The process 300 disclosed in FIG. 3 may be executed, e.g., by one or more of client 110 and server 130 of FIG. 2. Although process 300 of FIG. 3 is described with reference to FIG. 2, the process 300 is not limited to such a configuration and can be applied to other systems and configurations.

The process begins at S310 with the receipt of a request for a content labeled map. The request may be received when a user enters a zip code or the name of a city into an input device 216 of a client 110 running a mapping application, thereby indicating the geographic area for which a map is desired. The user may also enter the type of content the user wishes to have displayed on the map based on choices provided by the map application. Types of content may include weather information, photos, video, statistical information, or event specific information such as voting results in an election. Statistical information may include population density, disease outbreak information, energy usage, or the like. Event specific information may be information about current events, such as the results of a bicycle race or marathon, the amount of money raised by each school in a school district fundraiser, or the like.

At S320, the server 130 determines a plurality of orientation points on the map. An orientation point may correspond to a particular location expressed as a longitude and latitude, or a location of a city, a country, a continent, a body of water, a business, a town, an intersection, a geographic landmark, a historic landmark, a cultural landmark, a monument, or the like. Each orientation point includes a ranking, which may be based on one or more factors (e.g., population, popularity, etc.) of the orientation point. For orientation points that correspond to cities or towns, for example, the orientation points may be ranked based on a combination of population and popularity. Thus, cities and towns that are more popular and that have a larger population are ranked higher as orientation points. The popularity of orientation points can be measured in any number of ways, including the number of search queries received by the mapping application that include the orientation points. Popularity is deemed to be higher as more search queries are made for the orientation points.

The ranking of the orientation points may also be based on a user profile. When the ranking is also based on the user profile, an orientation point is ranked higher when the user profile indicates a user connection to or interest in the orientation point. For example, orientation points may be ranked higher based on user profile or related information when the orientation points appear in the user profile as the user's home address, work address, or current address or when the user's profile stores information associating the user with the orientation points appearing, e.g., as vacation destinations, locations commonly appearing in search queries, or locations at where the user has previously been (e.g., locations at which the user has checked in using a social networking service). Each piece of information in the user profile associating the user with an orientation point may be given a predetermined weight, reflecting the interest level of the user with respect to the orientation point. For example, a user profile may indicate that the work address of a user requesting a content labeled map is Mountain View, Calif. In such case, Mountain View may rank higher as an orientation point than other nearby locations, such as San Jose, Calif., even though San Jose has a larger population and may be more popular (e.g., receive more search queries).

The ranking of the orientation points may affect their display on the map. The proximity of highly ranked orientation points may also affect their display on the map. For example, the mapping application may require a predetermined minimum distance between the orientation points displayed on the map, and the orientation points may be selected for display in a descending order of their ranks, while conforming to the minimum distance between orientation points.

Specifically, starting with the highest ranked orientation point in a list or orientation points, a determination is made whether the distance between the highest ranked orientation point and the closest orientation point already selected for the map is greater than the minimum predetermined distance. If it is, the highest ranked orientation point in the list is selected for the map. If it is not, the highest ranked orientation point is discarded. In either case, the next highest orientation point is analyzed to determine if it satisfies the minimum distance requirement, and is either selected or discarded based on the analysis. In this manner, each of the ranked orientation points in the list of orientation points is examined in descending order until all the ranked orientation points in the list have been analyzed and are either selected for display on the map, or discarded for failing to conform to the predetermined minimum distance requirement.

The minimum distance can be predetermined based on the expected sizes of pieces of content to be associated with the orientation points, the expected length of labels identifying the orientation points, or both. Specifically, the minimum distance can be predetermined such that the distance between two neighboring orientation points selected for display on the map is sufficient to accommodate the pieces of content to be associated with the orientation points, the labels that may be displayed with the orientation points, or both. For example, if the pieces of content are images, the predetermined minimum distance can be some multiple of the default size of an image thumbnail to be associated with the orientation points displayed on the map (e.g., 2X or 3X the size of a thumbnail) Likewise, if the pieces of content are weather icons, the minimum distance can be some multiple of the default size of a weather icon.

The minimum distance may be different for different directions of the map. For example, different minimum distances may be determined for the horizontal direction of the map and the vertical direction of the map. Further, the selection of the ranked orientation points for display on the map may be performed again when the zoom level of the map changes, and the predetermined minimum distance may depend on the zoom level of the map.

In step S330, the server 130 obtains content for inclusion in the map. As noted above, the type of content included for display on the map may be determined by user selection. For example, the user may want to see weather information, local news, voting results, or photos that are associated with the map's orientation points. A single type of content may be displayed at each orientation point, or alternatively, multiple types of content may be displayed at each orientation point. Weather information may include temperature, humidity, a forecast, current conditions, atmospheric conditions, heat index, and the like. Voting results may include the number of votes associated with each of a plurality of political parties, the number of votes cast for each candidate in a particular location, the winner of the vote at the particular location, the winning party at the particular location, or the like.

As noted above, each piece of content may be associated with a location. For instance, weather information may be associated with the location of the weather station at which the information was recorded. Voting information may be associated with the location at which votes were taken or tallied. Photographs and videos may be associated with the locations at which they were taken. The locations may be user specified or automatically determined. The locations of photographs and videos may also be determined from the locations of monuments or geographic areas that are the subject of the photograph, or from the location of a city, town, or geographic region in which the photograph was taken.

Pieces of content may have weights assigned to them, and may be ranked based on their respective weights. The weights may indicate the accuracy, popularity, age, or the like of the respective pieces of content. For example, a photograph that has received several comments or that has been viewed often may receive a larger weight than other photographs that have not been commented on or viewed. Photographs may also be weighted based on their age, or based on the length of time they have been publicly available. Information from a weather station that is consistently accurate may be assigned a larger weight than information from a weather station that is consistently inaccurate. The pieces of content may also be weighted based on the frequency with which information from a provider of the content is updated. For instance, weather conditions from a weather station that provides minute to minute updates may be given a higher weight than weather conditions from a weather station that only updates the information every six hours.

As noted above, multiple pieces of content may be associated with a single orientation point. For instance, 30 photographs may be associated with an orientation point indicating the geographic location of the Stonehenge monument. In addition, a single piece of content may be associated with multiple orientation points. For example, weather information from a single weather station may be associated with multiple orientation points corresponding to the towns surrounding the weather station.

In step S340, the server 130 associates at least one piece of content with each of the orientation points selected for display on the map. For example, in a map for displaying weather conditions, the server 130 can associate weather information obtained from a weather station near Chicago with an orientation point corresponding to Chicago. If there are five weather stations with locations surrounding Chicago, a single weather station can be selected for association with the Chicago orientation point. The single weather station can be selected based on its proximity to Chicago, its accuracy, its popularity or frequency of use, the frequency with which it provides updates, or a combination of these and other factors. For instance, information from the weather station that is physically closest to the city of Chicago may be assigned to the orientation point for Chicago. Alternatively, information from the most accurate or highest ranked weather station within a 3 mile radius of the City of Chicago may be assigned to the orientation point for Chicago. In some implementations, multiple pieces of content can be combined, and the combined information can be associated with an orientation point. For example, the weather information (e.g., temperature) from the five weather stations surrounding Chicago can be combined and associated with the city of Chicago. When multiple pieces of content associated with a single orientation point are combined, the combined information may be a weighted average that is based on the weights of the individual pieces of content.

In step S350, the server 130 provides a map displaying information from the selected content items that are associated with the selected orientation points to client 110. The map may also include a label identifying the selected orientation points at which the selected content items are displayed. The labels may be in the form of text, icons, boundary lines or the like. For example, content information for a map displaying the weather can include the current temperature or an icon indicating the current weather condition (e.g., a bright sun indicating a clear sky) at the locations of each of the orientation points. The orientation points may be labeled to identify them (e.g., to indicate the name of a city, a town, a monument, a body of water, a famous location, or the like). The map may be shown at specific zoom levels based on the density or number of orientation points or pieces of content displayed. If the zoom level is changed, the number of orientation points or pieces of content displayed on the map may also change. Pieces of content that are no long displayed on the map may be displayed in a different portion of the map or next to the map.

Figure 4A:
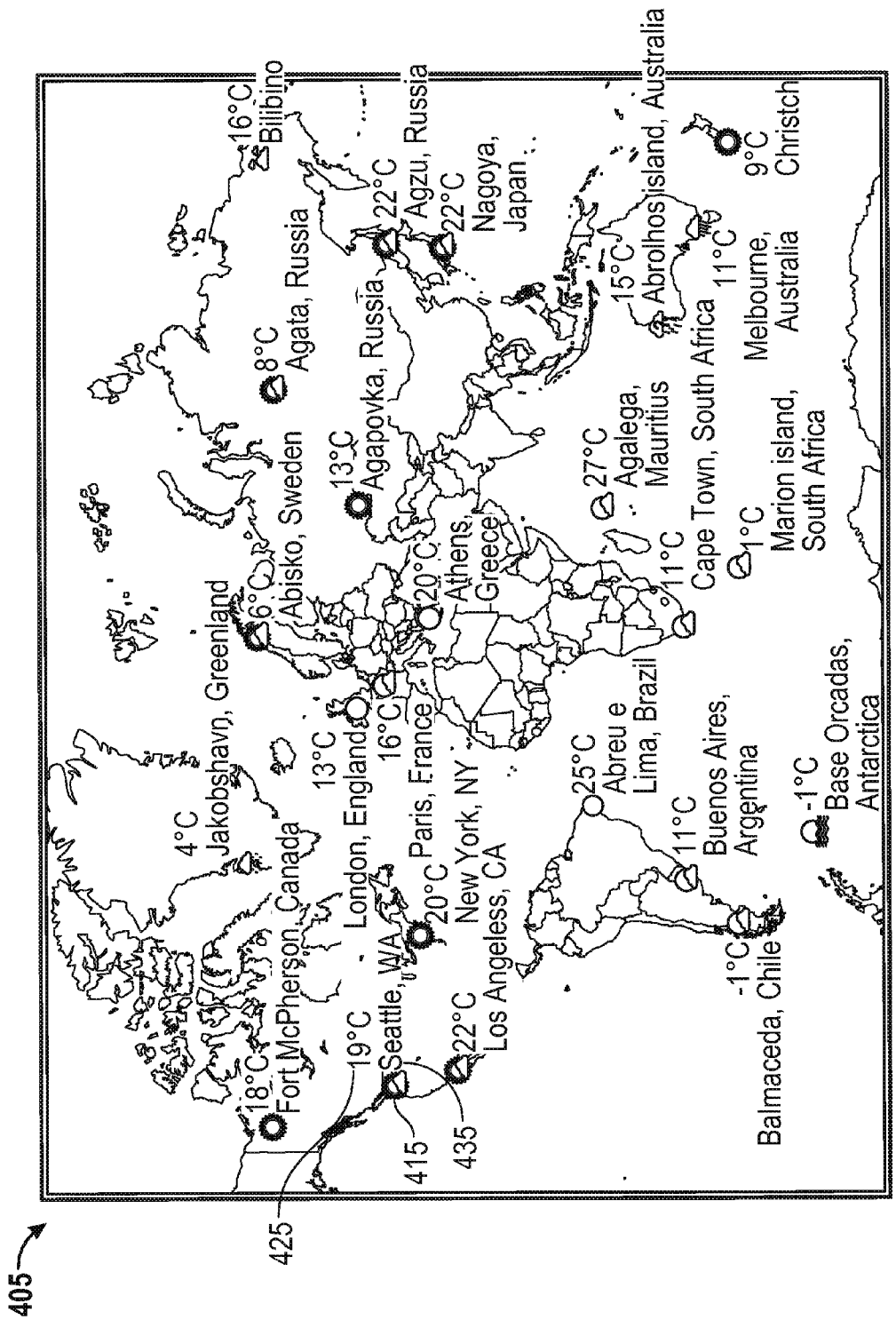
FIG. 4a is an illustration of a map as it relates to aspects of the subject technology.

FIG. 4a is an illustration of a custom labeled, content based map. Map 405 displays a world map that has been customized to display weather information. Pieces of content 415 and 425 constitute different types of weather information that can be displayed on map 405 at orientation point 435. Piece of content 415 is an icon illustrating the current weather conditions at the orientation point. Piece of content 425 displays the current temperature at the orientation point. The textual label of orientation point 435 (e.g., the label "Seattle, Wash.") may indicate the location of the orientation point 435. Pieces of content 415 and 425 and the label of orientation point 435 may constitute part of the base map 405 or may be a separate layer over the base map 405.

The orientation points for which the associated weather information is displayed on the map 405 are selected based on a ranking of orientation points and a predetermined minimum distance between the orientation points displayed on the map. As discussed above with reference to FIG. 3, the orientation points are ranked based on various factors, such as, for example, population and popularity associated with the orientation points, and user profiles. The orientation points are displayed on the map based on their rank, subject to satisfying a predetermined minimum distance from other orientation points already displayed on the map as explained above. For example, map 405 shows various orientation points corresponding to different cities that have been selected for display on the map. Based on the ranking of orientation points as described above, New York was ranked the highest and was first selected for display. Los Angeles was ranked the next highest, and was selected for display since the distance between Los Angeles and New York is greater than the minimum distance threshold. London, England was ranked the next highest after Los Angeles, and was selected for display on the map 405 since the distance between London and New York (i.e., the closest displayed orientation point) is greater than the minimum distance threshold. The next highest ranked orientation point after London may have been San Francisco, Calif. However, since San Francisco is too close to Los Angeles, which is a higher ranked orientation point that is already selected for display (i.e., the distance between the two cities is less than the minimum distance threshold), San Francisco is not selected for display on the map 405. Similarly, other ranked orientation points are selected for display or rejected for display on the map using the ranking and minimum distance threshold criteria.

Figure 4B:
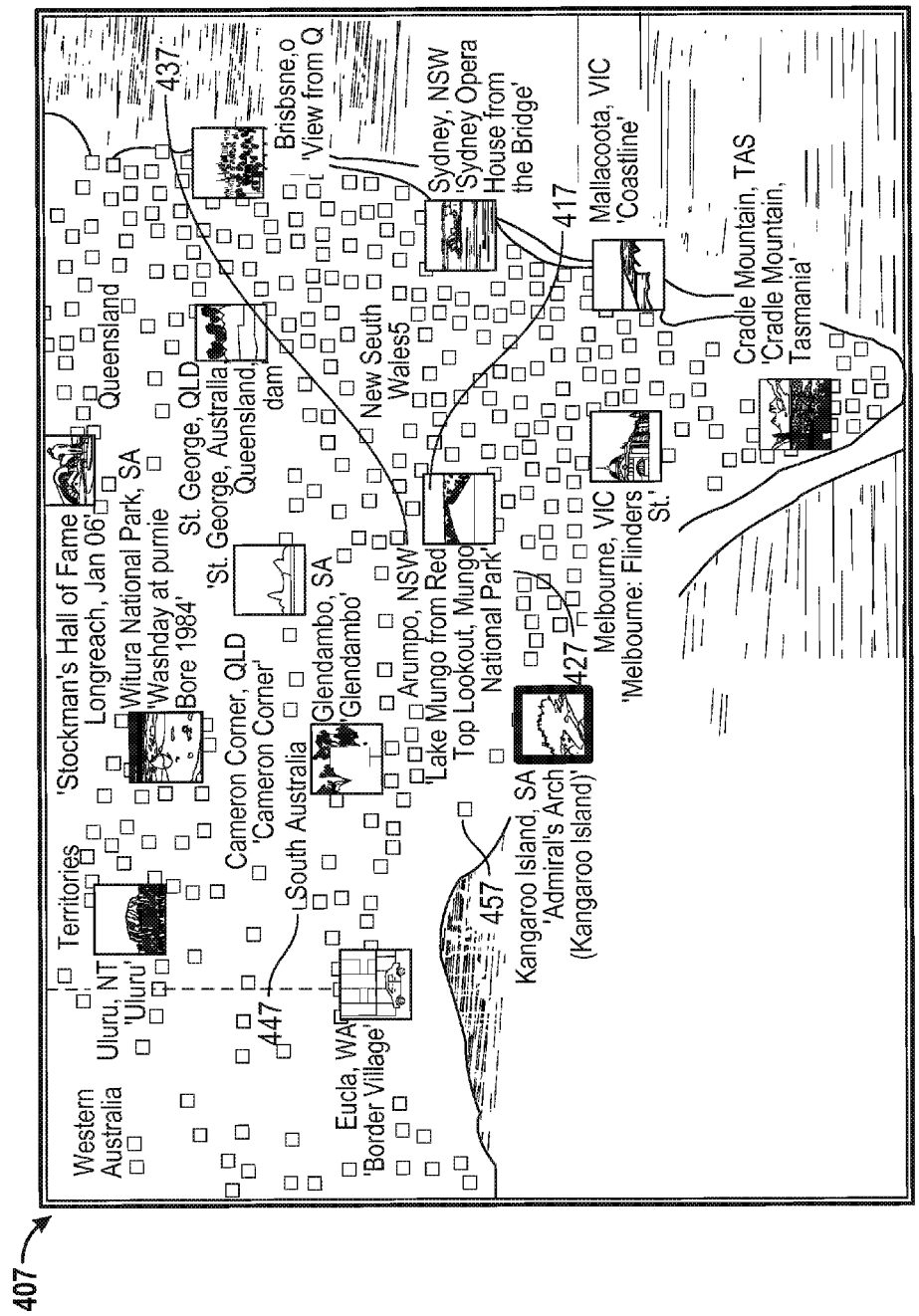
FIG. 4b is an illustration of a map as it relates to aspects of the subject technology.

FIG. 4b is another illustration of a custom labeled, content based map. Map 407 displays photographs of landmarks taken in South Eastern Australia. Piece of content 417 is a thumbnail icon of a photograph that has been associated with an orientation point 437. Piece of content 427 provides information describing the photograph 417, such as the location of the photograph, a description of the photograph, or the title of the photograph. The information associated with piece of content 427 (e.g., its location, or the date and time it was taken) may be entered by a user or may be automatically determined by a digital camera or digital photography application. Multiple photographs may be associated with a single orientation point in the map 407. For example, each orientation point may be associated with the 5 highest ranked photographs taken near that orientation point. The icon displayed on map 407 may be that of the highest ranked photograph or the most recent photograph or the photograph that is closest to the orientation point, or any combination of these and other related factors. The textual label of orientation point 437 (e.g., the label "Arumpo, NSW") indicates the location corresponding to the orientation point 437.

The rank of an orientation point (or the weight of a piece of content associated with an orientation point) may determine the size of the piece of content as it is displayed on the map. For instance, orientation point 437 may have a higher rank than orientation point 457. As a result, the picture icon associated with orientation point 437 may be larger and more prominently displayed on the map than the picture icon associated with orientation point 457. The rank of an orientation point or the weight of a piece of content associated with the orientation point may determine whether a label for the orientation point is displayed at a particular zoom level of the map, may determine the number of pieces of content or the types of pieces of content that are displayed at a particular zoom level of the map, or may determine whether any piece of content or orientation point is displayed at all at a particular zoom level of the map.

Label 447 indicates additional information that may be displayed on the map in concert with orientation points and associated pieces of content in a manner that provides visibility for the label without obstructing or interfering with the display of the orientation points or their associated pieces of content. The label 447 may appear on top of lower ranked pieces of content or orientation points, or where no orientation points and associated pieces of content appear on the map. Additional location information may be associated with specific pieces of content or orientation points.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc.

In this specification, the term "software" is meant to include firmware residing in read-only memory or applications stored in magnetic storage, which can be read into memory for processing by a processor. Also, in some implementations, multiple software aspects of the subject technology can be implemented as sub-parts of a larger program while remaining distinct software aspects of the subject technology. In some implementations, multiple software aspects can also be implemented as separate programs. Finally, any combination of separate programs that together implement a software aspect described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

FIG. 5 conceptually illustrates an electronic system with which some implementations of the subject technology are implemented. Electronic system 500 can be a computer, phone, PDA, or any other sort of electronic device. Such an electronic system includes various types of computer readable media and interfaces for various other types of computer readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject technology. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject technology use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such as a random access memory. System memory 504 stores some of the instructions and data that the processor needs at runtime. In some implementations, the processes of the subject technology are stored in system memory 504, permanent storage device 502, and/or ROM 510. For example, the various memory units include instructions for custom labeling a map based on content in accordance with some implementations. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interface 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touchscreen that functions as both input and output devices.

Finally, as shown in FIG. 5, bus 508 also couples electronic system 500 to a network (not shown) through a network interface 516. In this manner, the computer can be a part of a network of computers such as a local area network ("LAN"), a wide area network ("WAN"), or an Intranet, or a network of networks, such as the Internet. Any or all components of electronic system 500 can be used in conjunction with the subject technology.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessors or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject technology described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Aspects of the subject technology described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject technology described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A computer-implemented method for generating a content based, custom labeled map, the method comprising:
   receiving a request for a map, including a geographic area to be displayed in the map and a type of content item to be displayed in the map;
   determining, by one or more processors, based on a ranking of locations in the geographic area, a plurality of orientation points to display on the map;
   determining, by the one or more processors, for each of the plurality of orientation points, a plurality of pieces of content to be associated with each orientation point, wherein each of the determined pieces of content has a ranking;
   generating, by the one or more processors, from the determined plurality of pieces of content a composite piece of content to associate with each orientation point;
   ranking, by one or more processors, each of the plurality of orientation points based at least in part on the weighted average of the composite piece of content associated with each orientation point; and
   generating a map to display, on a display device, at the locations of the plurality of orientation points the composite pieces of content respectively associated with each orientation point at a level of prominence that is based on the ranking of each orientation point.

2. The method of claim 1, wherein generating the map further comprises generating the map to display a label indicating the locations of the plurality of orientation points.

3. The method of claim 1, wherein determining the plurality of pieces of content to associate with each orientation point further comprises associating with each orientation point a piece of content from among a plurality of pieces of content based on at least one of a ranking of the piece of content, a popularity of the piece of content, an accuracy of the piece of content, an age of the piece of content, or a distance between the piece of content and the orientation point.

4. The method of claim 1, wherein
identifying the plurality of pieces of content to associate with each orientation point is based on at least one of respective rankings of the pieces of content, popularities of the pieces of content, accuracies of the pieces of content, ages of the pieces of content, or distances between the pieces of content and the orientation point.

5. The method of claim 1, wherein determining the plurality of orientation points to display on the map further comprises selecting orientation points that correspond to locations in the geographic area that are at least a minimum distance away from the locations of higher ranked orientation points in the geographic area that have previously been selected for display on the map.

6. The method of claim 5, wherein the value of the minimum distance depends on the zoom level of the map.

7. The method of claim 5, wherein the value of the minimum distance is predetermined based at least on expected sizes of the composite pieces of content that are displayed on the map.

8. The method of claim 1, wherein the ranking of locations in the geographic area is based on at least one of population associated with the locations in the geographic area, popularity of the locations in the geographic area, or information contained in a user profile of a user requesting the map.

9. The method of claim 8, wherein the popularity of the locations in the geographic area is based on a number of search queries performed for the locations in the geographic area.

10. The method of claim 1, wherein determining the plurality of orientation points to display on the map further comprises:
receiving a ranked list of orientation points;
selecting, from the ranked list of orientation points, a highest ranked orientation point that has not been previously selected;
determining a distance between the location of the selected highest ranked orientation point and a closest orientation point in a list of orientation points to display on the map; and
adding the selected highest ranked orientation point to the list of orientation points to display on the map if the distance is greater than a predetermined minimum distance.

11. The method of claim 1, wherein the generating a map to display further comprises generating a label to indicate additional information to be displayed on the map in concert with the displayed orientation points and associated pieces of content.

12. The method of claim 1, wherein the generating a composite piece of content to associate with each orientation point comprises determining for each composite piece of content a weighted average based on the rankings of the determined plurality of pieces of content used to generate the composite piece of content.

13. A system for generating a content based, custom labeled map, the system comprising:
one or more processors; and
one or more memories containing processor-executable instructions that, when executed by the one or more processors, cause the system to:
receive a request for a map, including a geographic area to be displayed in the map and a type of content item to be displayed in the map;
determine, based on a ranking of locations in the geographic area, a plurality of orientation points to display on the map;
select orientation points that correspond to locations in the geographic area that are at least a minimum distance away from the locations of higher ranked orientation points in the geographic area that have previously been selected for display on the map, wherein the value of the minimum distance is predetermined based at least on expected sizes of one or more pieces of content that are displayed on the map;
determine, for each of the plurality of orientation points, one or more pieces of content to be associated with each orientation point, wherein each of the one or more pieces of content has a ranking;
rank each of the plurality of orientation points based at least in part on the ranks of the one or more pieces of content associated with each orientation point; and
generate a map to display at the locations of the plurality of orientation points the one or more pieces of content respectively associated with each orientation point at a level of prominence that is based on the ranking of each orientation point, and to display a label indicating the locations of the plurality of orientation points.

14. The system of claim 13, wherein the instructions to determine one or more pieces of content to associate with each orientation point further comprise instructions to associate with each orientation point a piece of content from among a plurality of pieces of content based on at least one or a ranking of the piece of content, a popularity of the piece of content, an accuracy of the piece of content, an age of the piece of content, or a distance between the piece of content and the orientation point.

15. The system of claim 13, wherein the instructions to determine one or more pieces of content to associate with each orientation point further comprise instructions to:
identify a plurality of pieces of content to associate with each orientation point based on at least one of respective rankings of the pieces of content, popularities of the pieces of content, accuracies of the pieces of content, ages of the pieces of content, or distances between the pieces of content and the orientation point; and
generate from the plurality of pieces of content a composite piece of content to associate with the orientation point.

16. The system of claim 13, wherein the value of the minimum distance further depends on the zoom level of the map.

17. The system of claim 13, wherein the ranking of locations in the geographic area is based on at least one of population associated with the locations in the geographic area, popularity of the locations in the geographic area, or information contained in a user profile of a user requesting the map.

18. The system of claim 17, wherein the popularity of the locations in the geographic area is based on a number of search queries performed for the locations in the geographic area.

19. The system of claim 13, wherein the instructions to determine the plurality of orientation points to display on the map further comprise instructions to:
- receive a ranked list of orientation points;
- select, from the ranked list of orientation points, a highest ranked orientation point that has not been previously selected;
- determine a distance between the location of the selected highest ranked orientation point and a closest orientation point in a list of orientation points to display on the map; and
- add the selected highest ranked orientation point to the list of orientation points to display on the map if the distance is greater than a predetermined minimum distance.

20. The method of claim 11, wherein the label appears on top of lower ranked pieces of content or orientation points.

* * * * *